Figure 1:
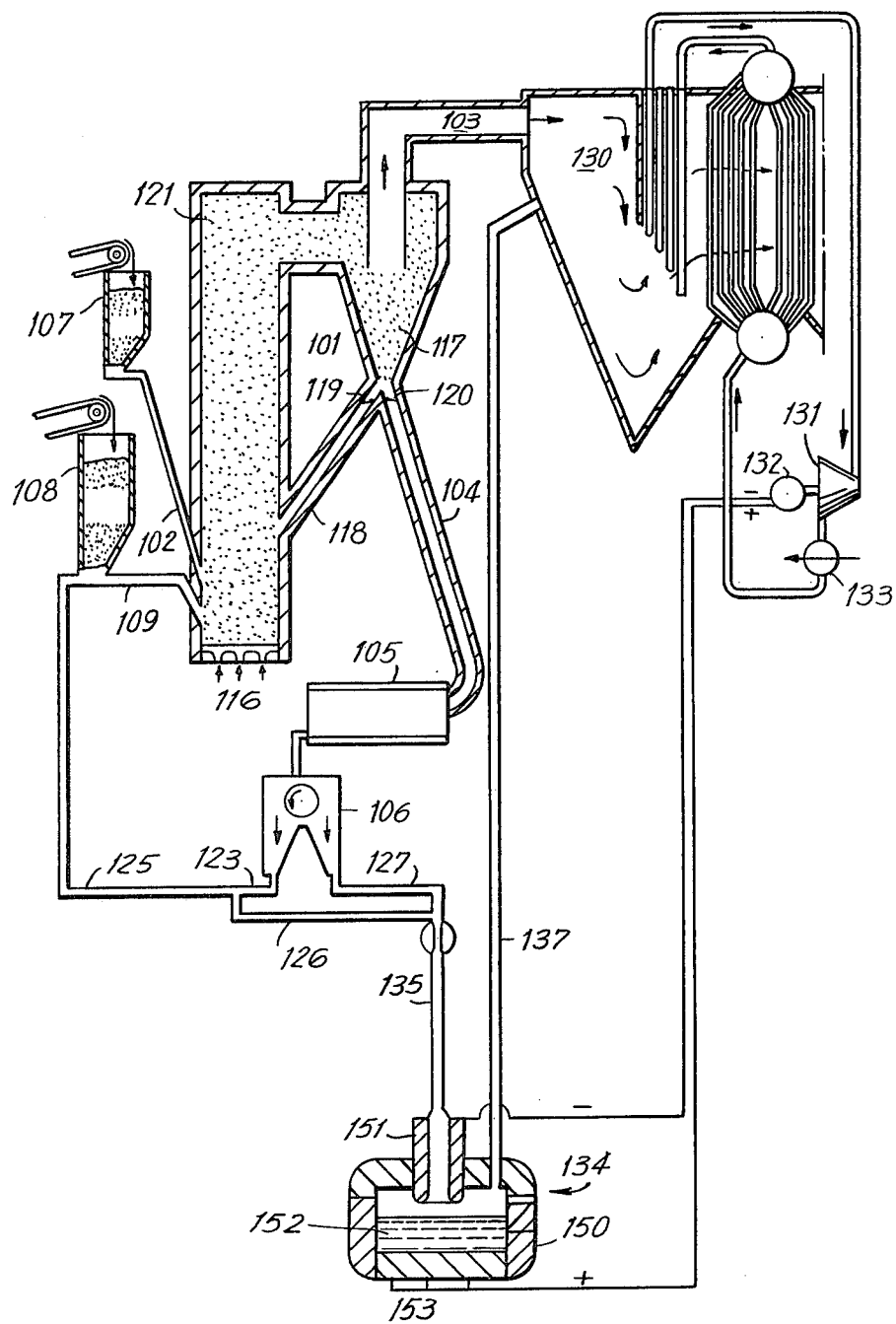

United States Patent [19]

Collin et al.

[11] 4,094,665

[45] June 13, 1978

[54] METHOD FOR SIMULTANEOUS COMBINED PRODUCTION OF ELECTRICAL ENERGY AND CRUDE IRON

[75] Inventors: Per Harald Collin, Falun; Bjorn Widell, Vasteras, both of Sweden

[73] Assignee: Stora Kopparbergs Bergslags AB, Falun, Sweden

[21] Appl. No.: 796,658

[22] Filed: May 13, 1977

[51] Int. Cl.² ............................................. C21C 5/52
[52] U.S. Cl. ......................................... 75/11; 75/38
[58] Field of Search .................. 75/11, 12, 13, 38, 26, 75/91

[56] References Cited
U.S. PATENT DOCUMENTS 3,985,544  10/1976  Collin et al. ............................. 75/11

OTHER PUBLICATIONS

Reh Fluidized Bed Processing Chem. Eng. Progress, vol. 67, No. 2, Feb. 1971 pp. 58–63.

*Primary Examiner*—M. J. Andrews
*Attorney, Agent, or Firm*—Curtis, Morris & Safford

[57] ABSTRACT

The invention relates to a method of combined production of electrical energy and crude iron and provides a further improvement over a method described in U.S. Pat. No. 3,985,544, issued Oct. 12, 1976; particularly, this method finds application when particulates of ≦ 1 mm in size are being used in practicing the further improved and described process.

3 Claims, 2 Drawing Figures

U.S. Patent  June 13, 1978  Sheet 2 of 2  4,094,665

METHOD FOR SIMULTANEOUS COMBINED PRODUCTION OF ELECTRICAL ENERGY AND CRUDE IRON

The present invention relates to a method for simultaneous, combined production of electrical energy and crude iron from carbonaceous materials and grained materials containing iron oxides. By crude iron is meant in this connection carbonaceous iron melts containing 2–6 percent carbon as well as the usual impurities and alloying substances from the raw materials used. By carbonaceous material is meant fuels and reducing agents containing carbon and hydrocarbons, for example, coal, coke, oil or natural gas, or mixtures of two or more of these. By grained materials containing iron oxides is meant iron ore concentrate, calcined iron pyrites or other oxides of iron having a particle size of up to 1 mm.

According to the invention, a simultaneous, combined production of electrical energy and crude iron is obtained from carbonaceous materials and grained materials containing iron oxides by means of a method comprising:

(a) performing reduction of the iron oxides in two separate operations, pre- and final reduction, the temperature being kept below the melting point of the crude iron during the pre-reduction and above said melting point during the final reduction, (b) for the pre-reduction of the grained materials, introducing carbonaceous material and the grained material containing iron oxides into a fluidized bed containing solid carbonaceous material, producing reducing gases in the fluidized bed by partial combustion of the carbonaceous material with air or oxygen gas, thereby pre-reducing the iron oxides by said reducing gases until the material has achieved a metallization degree of 30–80 percent, most of the heat requirement of the pre-reduction being covered by said combustion, (c) finally reducing and smelting the product prereduced to a metallization degree of 30–80 percent, as defined above, in said pre-reduction operation to produce crude iron by bringing the pre-reduced product into contact with carbon while supplying heat, the heat requirement of the final reduction being substantially covered by electric heating, and (d) conveying the exhaust gases from the pre- and final reduction operations are conveyed to a substantial extent conveyed directly to a thermal power station where the remaining energy contents of the gases (physical and chemical) are used to generate electrical power.

An important advantage of the method according to the invention is that it permits the direct use of inexpensive carbonaceous materials, such as, for example, oil and high volatile coal, for the manufacture of crude iron. The conventional manufacture of crude iron in a blast furnace requires metallurgical coke, which, per unit of reduction capacity, costs roughly twice as much as said inexpensive fuels which can be used according to the invention.

Another advantage of the invention is that the energy consumption per ton of crude iron manufactured is low. Only the heat losses due to radiation, etc. from the equipment are wasted; as the process comprises the generation of electrical energy, full use is made of all the exhaust gases in an integrated, combined use of all available energy.

Yet another advantage of the invention is that it permits the use of fine-grained materials containing iron oxides. This is a considerable saving in costs in comparison with the methods (for example, blast furnaces) which require agglomerated concentrates. In addition, as further described herein, especially fine-grained materials are usable, e.g., of a size < 1 mm. As it can be appreciated, the advantages of being able to utilize fine particles reside in the improved heat transfer and mass transfer so essential for improved process efficiency.

As will be shown in the following, the combination of the above advantages enables crude iron to be manufactured according to the invention at a cost which is about 30 percent less than crude iron manufactured in blast furnaces. Added to this, electrical power is obtained at the same time as the crude iron according to the present method at a cost which can very well compete with the price of conventionally generated electric power.

According to the method of the invention, the generation of electric power in a thermal power station is combined in such a way with the manufacture of crude iron that gasification of the carbonaceous material which, in a thermal power station would take place in its combustion chamber, is located in the section for the manufacture of iron. Thus, without detriment to the economy, generous quantities of reducing agent can be used in the crude iron process. This means that the reduction can be performed in equipment of a technically simple nature and the exhaust gases from the reduction process can be fully utilized to generate energy.

These and other advantages are described in U.S. Pat. No. 3,985,544, issued Oct. 12, 1976, the disclosure of which is incorporated by reference herein. The identified disclosure provides, without repetition, the framework for the further improvement over the described method.

The method according to U.S. Pat. No. 3,985,544, is suitable when it is desired to use fine-grained ores and fine-grained carbonaceous materials in a reduction process. The present invention deals with the specific case that a substantial fraction of the fine-grained material has a very small size, especially below 1 mm, preferably in such a grain mixture that 90 percent is below 0.3 mm. For treating these small sizes, it has been found, according to the invention, that the fluid bed should be of the fast or circulating type and that the heat necessary for the final reduction should be supplied by a direct current arc.

The advantage of a circulating fluid bed in this connection is that the material is recirculated, thus avoiding the disadvantage of a classical, noncirculating bed that extremely fine-grained material is liable to be carried away with the exhaust gases. A circulating fluid bed also has the advantage that it can be made substantially taller than a conventional bed and provides a longer contact time between the gas and the bed material, both reduction and combustion occurring within the bed. If a shorter, conventional bed is used, several beds have to be used connected in series, which is disadvantageous because of clogging of gas distributors as well as the higher cost of the apparatus and the increased loss of heat during operation.

A direct current arc has, in the present connection, the advantage that the arc is surrounded by a gas stream generated by the unidirectional arc, said stream catching the particles and confining these until these are brought into contact with the spot of naked metal generated by the arc on the surface of the bath. The gas stream also prevents the particles from adhering to the arcing tip of the tubular electrode. This type of furnace is further described in U.S. Pat. No. 3,940,551. Another advantage of the direct current arc furnace is that the gas stream causes roughly 80 percent of the heat developed by the arc to be concentrated on the surface of the melt, this concentration of the heat to the middle of the furnace resulting in a reduced wear of the lining of the furnace. Still a further advantage is the rapid reduction obtained in a furnace of this type.

The direct current arc furnace eliminates the disadvantage of other types of furnaces, for instance, induction furnaces, that the fine-grained material is blown about in the furnace, a problem that naturally becomes greater the as the material becomes more finely grained.

From the above, it is evident that the combination of a circulating fluid bed and a direct current arc furnace is very suitable for reduction when using extremely fine-grained raw materials and thus provides an improvement over the general method for reduction by using grained materials as described generally in U.S. Pat. No. 3,985,544.

Figure 2:
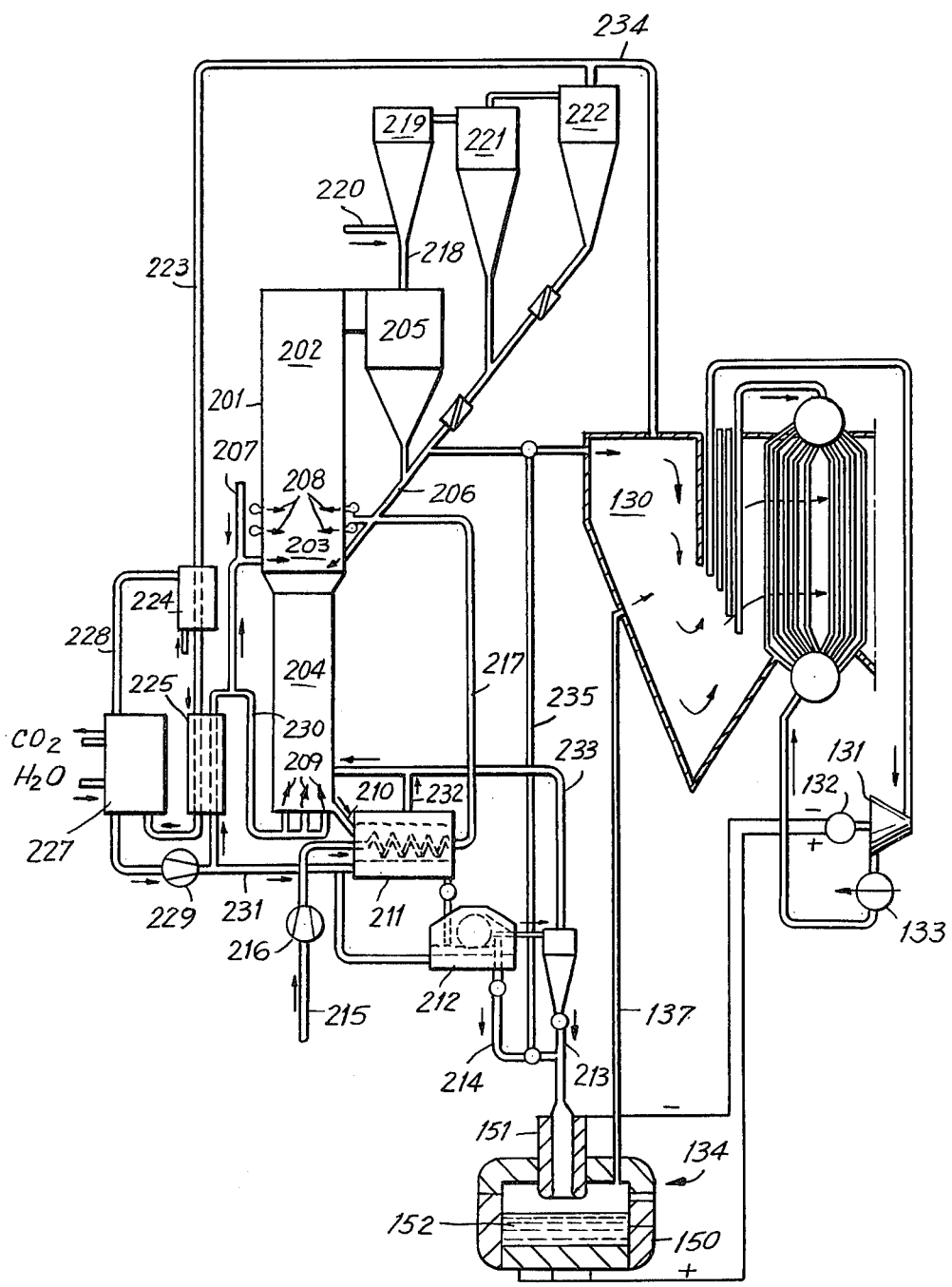
Figure 2:
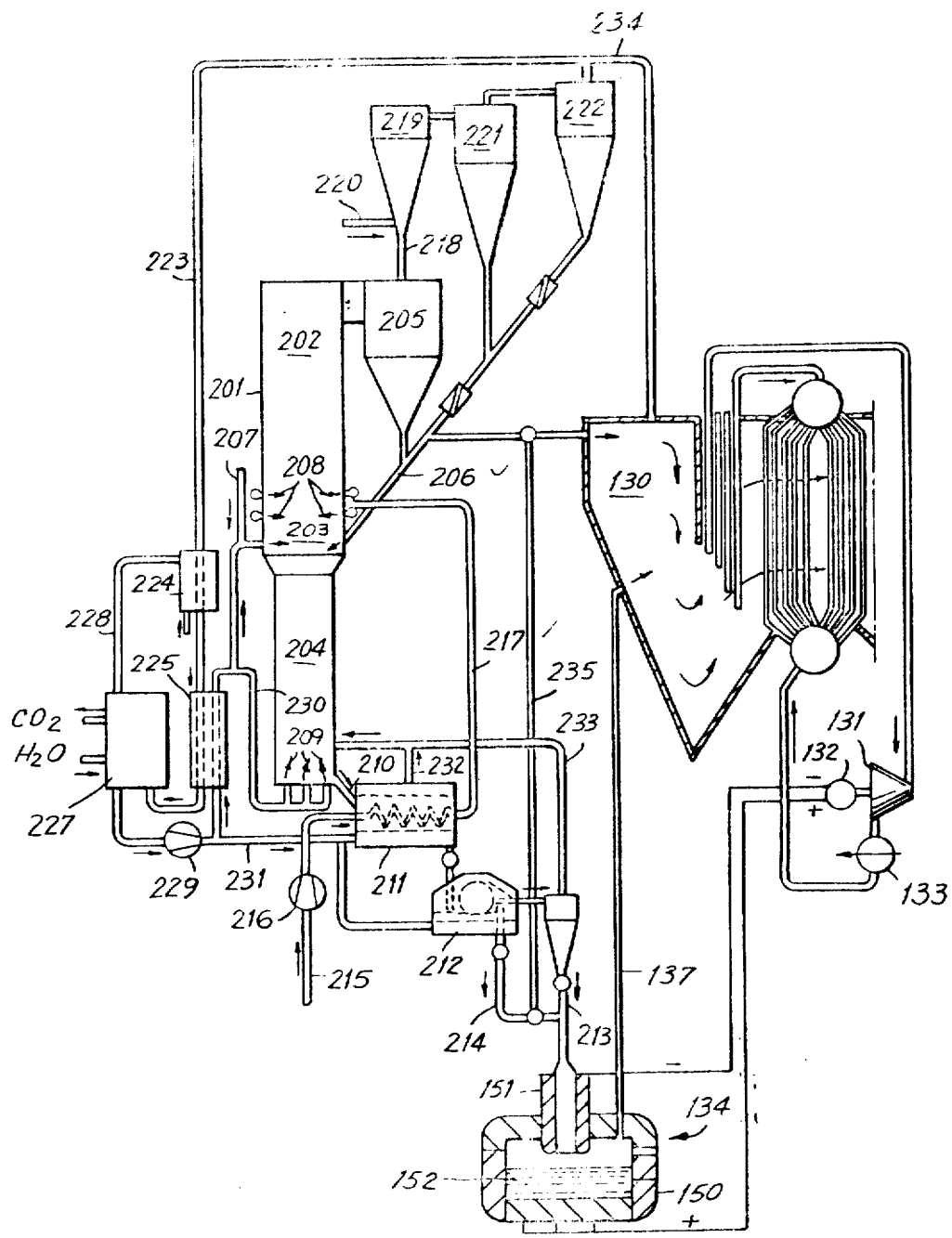

In and of itself the improvement is a further step away from the art and provides a further synergistic interaction of the various elements by advancing the iron production—electricity generation to a stage where the benefits will be further evident as described and exemplified with reference to the accompanying drawings wherein:

FIG. 1 illustrates a schematic flow diagram of a plant for carrying out the inventive process, and FIG. 2 illustrates another schematic flow diagram of another plant for carrying out the described process.

The pre-reduction in fluid bed can be performed in several different ways in accordance with the invention, as disclosed in FIGS. 1 and 2.

The fine-grained material containing iron oxides is possibly pre-heated in a special step, functioning on the same principle as a pre-reduction step, but the preheating permits complete combustion of the fuel supplied.

When crude iron is being manufactured, pre-reduction is performed in a fluid bed or a system of fluid beds by introducing carbonaceous material, fine-grained material containing iron oxides, and fluidizing gas including air or oxygen containing gas into the fluid bed. The proportions of the materials introduced into the beds are controlled so that the bed always contains solid carbonaceous particles, preferably in an amount having at least the same volume as the iron oxide containing material in the bed.

The solid carbon in the bed may be solid carbonaceous material introduced into the bed, or produced in the bed by coking of coal introduced as carbonaceous material, or by cracking of hydrocarbons introduced as carbonaceous material.

Air or oxygen gas is introduced in an amount giving, by partial combustion of the carbonaceous material, a reducing gas in the fluid bed and satisfying, by said combustion, most of the heat requirement of the pre-reduction. A part of the heat requirement of the pre-reduction may be satisfied by pre-heating, in separate equipment, the materials introduced into the fluid bed.

The solid carbonaceous particles in the bed prevent sticking of the iron oxide containing materials and their agglomeration. The bed temperature is preferably maintained at 800°–1000° C.

The pre-reduction of the iron oxides is continued until the material has achieved a metallization degree of 30–80 percent. The thus reduced material is tapped continuously, and depending on its carbon content, it is either conveyed directly to the final reduction, or if the carbon content is too high for the final reduction, it is first cooled below the Curie point and then separated magnetically mostly in one fraction containing pre-reduced material which is transferred to the final reduction. The other fraction containing mostly carbonaceous material is either recirculated to the fluid bed or used as fuel in the thermal power station. Accordingly, the material containing iron oxides passes through the pre-reduction unit, to which carbonaceous fuel and air or oxygen are supplied separately and controlled, while the exhaust gases from each step pass straight to the thermal power station. The material is thus treated by a cross-current flow. In most cases so far, efforts have been made to exploit the heating and reduction ability of the reduction gases by leading them in counter-current flow to the material through several beds.

It may be advantageous to preheat the raw materials with additional fuel, for example, oil, and make use of the physical heat content of the exhaust gases in the steam generator. Also, the air for gasification of the reducing agents and for heat generation can be pre-heated by the waste heat from the steam generator. The air may be completely or partially replaced by oxygen in order to adjust the gas flow when fluidizing particularly fine-grained material.

When manufacturing crude iron in accordance with the example shown, such as in FIG. 2 of U.S. Pat. No. 3,985,544, it has been found suitable in practice to continue the pre-reduction process to more than 50 percent degree of metallization, preferably 60–80 percent. The reason for this preferred metallization range is that the investment costs per ton annual capacity of crude iron for a plant operation in accordance with the method of the invention is within this range, approximately the same as for a blast furnace process (including sintering plant, coking plant, and power station for the blast furnace gas) having the same capacity. At higher degrees of metallization, the investment cost per ton annual capacity for the method according to the above process will be higher than those for the blast furnace process, because of the ever larger thermal power station. Since capital is always hard to obtain, the method described in U.S. Pat. No. 3,985,544 is usually most attractive in said range where the prime cost of the crude iron is approximately 30 percent lower than crude iron produced by the blast furnace process, but the investment per year/ton is the same for the two processes.

As has been described above, it is clear from FIG. 2 of U.S. Pat. No. 3,985,544, that in that case only 27 percent of the total energy supplied to the pre-reduction step is found in the pre-reduction product in the form of physically and chemically bound energy. In the two steps of the pre-reduction, $0.6 + 3 = 3.6$ kmol CO — $H_2$ was used per kmol Fe in the pre-reduction product.

In three reduction steps, for example, connected in countercurrent flow, the theoretical minimum for reduction purposes is about 2.3 kmol CO + $H_2$. The method according to FIG. 2 of the above U.S. Pat. No. 3,985,544 requires a larger quantity of reducing agent in order to achieve the same degree of metallization. However, this has permitted the use of simpler equipment without having to reuse hot, dusty gases for reduction purposes which in practice causes considerable technical problems, particularly where large reduction units are concerned.

The higher the temperature used for the pre-reduction, the higher will be the reduction speed, but also the risk of sticking between the individual grains of concentrate in the beds, resulting in the formation of large agglomerates. However, solid carbonaceous material present in the fluid bed prevents sticking, so that sufficiently high temperatures can be used.

Lime (and/or limestone) which are required for slag formation in the final reduction, may be added with advantage even before the pre-reduction. A considerable proportion of the sulphur content of the reducing agent will then be bound to the lime and the content of sulphur dioxide in the exhaust gases from the thermal power plant will be reduced.

Alternatively, reducing agents having a higher sulphur content can be used for the pre-reduction without exceeding the permitted content of sulphur dioxide in the flue gases. The possibility of using reducing agents with high contents of sulphur is an advantage of the present method as these reducing agents can be obtained at advantageous prices.

The pre-reduced product is finally reduced and smelted in contact with carbonaceous material while heat is being supplied.

Returning now to the drawings, FIG. 1 shows an embodiment of the invention in which the fluid bed and the furnace 134 are of a modified type compared to those disclosed in U.S. Pat. No. 3,985,544. The fluid bed in FIG. 1 is of the so-called fast or circulating type as defined in, for instance, *Chemical Engineering Progress*, Vol. 67, No. 2, 1971, pages 58-63, L. Reh: "Fluidized Bed Progressing". The furnace 134 shown in FIG. 1 is a direct current arc furnace.

The fast fluid bed comprises a reactor 101 with inlets 102 for fine-grained material, outlets for gas 103 and bed material 104, a cooling device 105 for the discharge bed material, a magnetic separator 106 connected to the cooling device, a steam boiler 130 (shown only partially), a steam turbine 131 with a generator 132 for direct electric current and a condenser 133, a melt reduction furnace 134 with inlet means 135 for carbonaceous material and material containing pre-reduced iron oxide and an outlet for gas 137 leading to the boiler 130.

The plant works in the following way. Fine-grained material 107 containing iron oxide and fine-grained solid carbonaceous material 108 is fed to the reactor chamber 121. By supplying pre-heated air and possibly steam 116, the material is fluidized in such a manner that the material is transferred to cyclone 117 and is separated and returned along the conduit 118. Part of the material is diverted from the cyclone via a conduit 104 to a cooling drum 105. One way valves 119 and 120 prevent gas from returning back to the cyclone. When the material has been cooled below the Curie point, it passes on to a magnetic separator 106, where it is separated into a magnetic fraction 127 and a carbonaceous fraction 123. A part 125 of the carbonaceous fraction returns to the circulating fluid bed together with new material via a feeder 109, while another part 126 is led to the melt reduction furnace 134.

The furnace 134 comprises a chamber 150 with an electrode 151 of annular cross section acting as cathode. The melt 152 in the furnace acts via the bottom connection 153 as anode. The fine-grained material from the conduit 135 is supplied to the furnace through the hole of the annular cathode. This type of furnace is further described in U.S. Pat. No. 3,940,551, issued Feb. 26, 1976.

FIG. 2 shows a further embodiment of the invention in connection with a fast fluid bed. A specific feature of this embodiment is that fluidizing gas is supplied into the bed at two different levels. At the lower level is introduced part of the exhaust gas from the reactor which has been regenerated to a strongly reducing gas, serving for reduction and fluidization. At an upper level, remote from said lower level, are introduced carbonaceous material and a gas containing oxygen which after combustion serve for reduction, heating, and additional fluidization. The purpose of this arrangement is to introduce the carbonaceous material and the oxygen at a point where the gas from the lower gas supply has brought the bed material into a fast fluid state, thereby counteracting agglomeration around the inlets for the gas containing oxygen.

The plant consists of a vertically elongated reactor 201, the upper part 202 of which encloses the upper part of the fluid bed, the central part 203 of the reactor enclosing the intermediate zone, above referred to, of the fluid bed and its lower part 204 the lower part of the fluid bed. A cyclone 205 is connected to the upper part 202 of the reactor and has a return conduit 206 leading to the central part of the reactor. There are also one or more inlets for carbonaceous material 207 in the central zone.

The gas containing molecular oxygen is supplied to the central part 203 of the reactor divided in a number of streams, through nozzles 208, while the recirculated (recycled) gas is supplied to the lower part 204 of the reactor through a suitable distributor 209. Treated solid material is discharged through an outlet 210 in the lower part of the reactor, cooled in a heat exchanger 211 and in case of a balance of coke passed to a magnetic separator 212 in which it is separated into a substantially coke-free fraction 213 and a substantially iron-free fraction 214.

The gas containing molecular oxygen, preferably air, is blown 216 through conduit 215 through the heat exchanger where it is preheated, and through the conduit 217 to nozzles 208. The heat exchanger 211 is preferably built as a conventional fluid bed with submerged heat transfer elements for preheating the gas containing molecular oxygen.

Part of the exhaust (for instance 50 percent) 218 from the cyclone 205 is transferred to a venturi device 219 where it preheats the fine-grained material containing iron oxides, for instance, ore concentrate entering via line 220, possibly mixed with return coke from the magnetic separator. The flow of gas and material is then conveyed to a cyclone 221 and then to a fine cleaning cyclone 222 in which the solid material is separated and returned to the central part of the reactor, preferably through the return conduit 206. The gas, cleaned from solid material, is conveyed along a conduit 223, optionally being cooled indirectly at 224 by boiling water, and through a heat exchanger 225 to scrubbers 227 where it is substantially freed from $H_2O$ and $CO_2$. Cooling by boiling water may be necessary to prevent the temperature in the heat exchanger from becoming too high for the construction materials used. $H_2O$ can be removed through direct or indirect cooling. $CO_2$ is washed out, for instance, using alkaline solution, in which case steam in line 223 from the boiler 224 can be used to regenerate these solutions. If the pressure in the system is sufficiently high, $CO_2$ can be washed out with water. Most of the gas coming from the scrubbers, which is driven by a compressor 229, is heat-exchanged at 225 with gas entering the scrubbers and is introduced as fluidizing and reducing gas into the lower part 204 of the reactor. This produces a strongly reducing zone 204 through which the solid material passes before being discharged. In view of the smaller gas flow, this part 204 of the reactor is suitably given a smaller diameter than the upper part 202. A partial stream of gas in line 231, substantially free of $CO_2$ and $H_2O$, is used without being heated in the heat exchange as fluidizing gas in the heat exchanger 211 for discharged solid material and in the magnetic separator 212 and is then conveyed via 232 and 233 into the lower part of the reactor. The remainder of the exhaust from the cyclone 222, is conveyed in a conduit 234, preferably to be used as fuel in a thermal power station 130. The thermal power station 130 and furnace 134 in combination are comprised of the same elements as shown in FIGS. 1 and 2; and for these same elements are labeled with the same numerals.

The iron fraction 213 from the magnetic separator 212 is passed to a furnace 134 of the same type as described in connection with FIG. 1.

The coke fraction 214 can be conveyed either to the furnace 134 or via a conduit 235, either back to the reactor via conduit 206 or to the thermal power plant 130. The electric power generating equipment of the plant is the same as in FIG. 1.

The fluid bed shown in FIG. 2 is further described in U.S. patent application Ser. No. 610,391, filed Sept. 4, 1975.

A specific advantage of the reduction plant shown in FIG. 2 is the one mentioned above; namely, that both the furnace and the fluid bed are especially suitable for treatment of fine-grained material < 1 mm.

Unless a distinction has been made with respect to the process identified in prior U.S. Pat. No. 3,985,544 in practicing the present invention, wherever the term "fluid bed" or "fluidized bed" has been used, it is intended to mean a "fast fluid bed".

What is claimed is:

1. In a method for production of crude iron from iron oxide and carbonaceous materials wherein electricity is generated as part of the crude iron production and said generated electricity is reutilized in said production of crude iron, the improvement comprising:

maintaining a fast fluidized bed of solid fine-grained carbonaceous material and iron oxide, continuously adding iron oxide and carbonaceous material to said fluidized bed, continuously adding an oxygen-containing gas to said fluidized bed, maintaining in said fluidized bed a temperature high enough to react the oxygen of said oxygen-containing gas with the carbonaceous material to produce a reducing gas, withdrawing reducing gas and solid particles of partially reduced iron oxide and carbonaceous material from the top of the fluidized bed, separating said reducing gas from said solid particles, conveying at least part of said separated solid particles to the fluidized bed at a level between its top and bottom, burning said separated reducing gas in a combustion zone to produce heat, converting said heat into direct current electricity, withdrawing from the fluidized bed carbonaceous material and iron oxide having been partially reduced to a metallization degree of 30–80 percent, maintaining a pool of molten crude iron by maintaining a temperature sufficient to keep molten crude iron in said pool by having a direct current electric arc between a tubular electrode and the surface of the pool, feeding said electric arc with said direct current electricity, conveying the iron oxide, having a metallization degree of 30–80 percent, and at least part of the accompanying carbonaceous material to said pool through said tubular electrode and said direct current electric arc, and burning the gas produced in said pool in said combustion zone to add to the production of electricity.

2. The method as defined in claim 1 wherein part of withdrawn carbonaceous material and iron oxide having been partially reduced to a metallization degree of 30–80 percent, by weight, is further magnetically separated into a fraction rich in said partially reduced iron oxide and a fraction of carbonaceous material and said carbonaceous material is reintroduced into said fast fluid bed, and said fraction of said rich partially reduced iron oxide is introduced through said tubular electrode into said molten pool.

3. The method as defined in claim 1 wherein the fine-grained material is a grain mixture 90% of which has grains below about 0.3 mm.

* * * * *

UNITED STATES PATENT AND TRADEMARK OFFICE
CERTIFICATE OF CORRECTION

PATENT NO. : 4,094,665                                              Page 1 of 2
DATED      : June 13, 1978
INVENTOR(S) : Per Harald Collin and Bjorn Widell It is certified that error appears in the above-identified patent and that said Letters Patent are hereby corrected as shown below:

It is respectfully requested that a correction be made in Figure 2 of the above-identified patent at the crossover point of lines 206 and 217. These lines are separate and distinct and are not in communication with each other and should appear as per attachment.

Signed and Sealed this

Twenty-seventh Day of February 1979

[SEAL]

Attest:

RUTH C. MASON
Attesting Officer

DONALD W. BANNER
Commissioner of Patents and Trademarks